3,413,471
CHLORINE LOGGING METHODS
Jay Tittman, Danbury, Conn., assignor, by mesne assignments, to Schlumberger Technology Corporation, Houston, Tex., a corporation of Texas
Filed Aug. 28, 1962, Ser. No. 219,970
10 Claims. (Cl. 250—83.3)

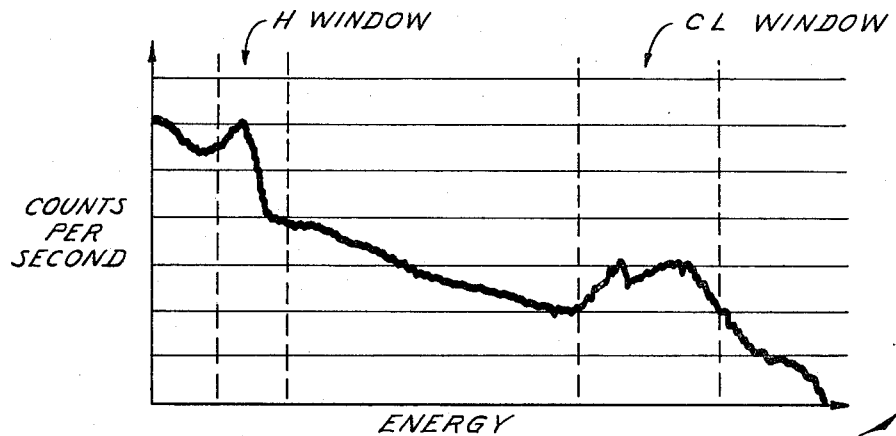
Fig. 2
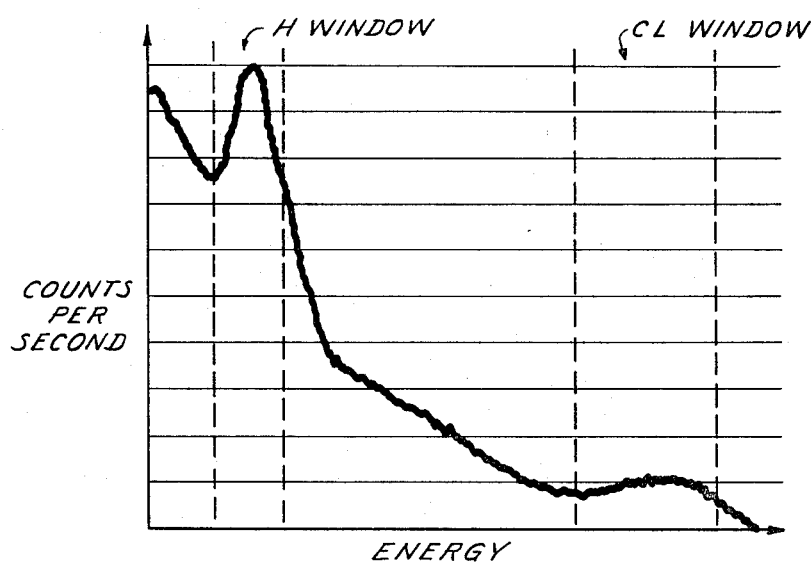
Fig. 3
Fig. 5
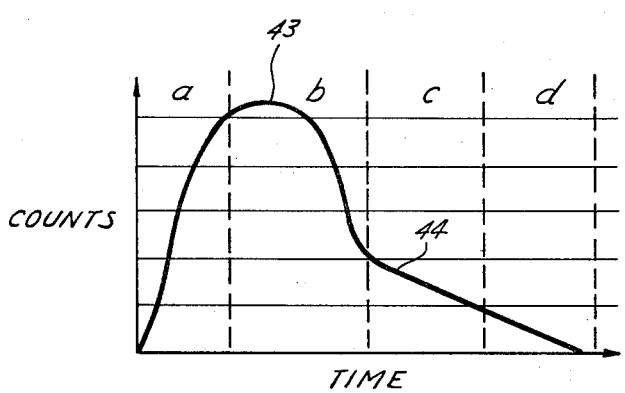
Jay Tittman
INVENTOR.
BY Robert M. Sperry
ATTORNEY

United States Patent Office 3,413,471
Patented Nov. 26, 1968

This invention relates to radioactivity well logging and is particularly directed to novel methods for distinguishing well formations containing oil from those containing salt water.

Generally, in logging wells or boreholes to determine the content of formations through which the borehole passes, it is desirable to distinguish between various fluids, such as salt water and oil, for example, which may be contained in porous formations. Also, it is important to determine the line of contact between oil bearing and salt water bearing formations. Although various systems for accomplishing this have been proposed, many of these are subject to uncertainties resulting from varying formation porosity and rock matrix and each of them has limitations in its capability of providing a rapid and accurate log of such formations, particularly when disposed behind well casing, in a convenient manner.

The basic approach of most of the systems heretofore proposed for distinguishing between oil and salt water bearing formations behind casing have been to attempt to separately measure two functions of both porosity and salinity and solve simultaneously, or to measure salinity directly in some manner fortuitously independent of porosity. Various methods and apparatus have been devised, each aiming to distinguish hydrogen and chlorine from extraneous elements and to indicate the quantities of these elements present in the formations. However, although relatively accurate measurements of these quantities are obtainable with some of the prior art methods and apparatus, considerable skill and training in log interpretation are still required in order to translate the information provided by the logs into the information actually desired concerning the formation content. Moreover, when non-gamma ray emitting neutron absorbers, such as boron, are present in the borehole or the adjacent formations, both the thermal neutron density and the capture gamma ray spectrum will be depressed which causes many prior art logging systems to provide information which is erroneous or unintelligible.

These disadvantages of prior art logging methods are overcome with the present invention and novel methods for hydrogen-chlorine logging are proposed which virtually eliminate the effects of extraneous elements and non-gamma ray emitting absorbers and provide a log which may be rapidly and easily interpreted.

The advantages of the present invention are preferably attained by providing novel methods for irradiating the formations surrounding a well with bursts of high energy neutrons, detecting the gamma ray spectrum resulting from capture of thermal neutrons by elements contained in the formations, measuring those gamma rays resulting from neutrons capture by chlorine and occurring during a time period corresponding to the lifetime of thermal neutrons in a formation containing a high proportion of chlorine, measuring those gamma rays resulting from neutron capture by hydrogen, and indicating the ratio of said measurements.

In the alternative, hydrogen-chlorine ratio logs using the same time gates for measuring both hydrogen and chlorine may be combined with logs which indicate chlorinity as a result of its effect on the thermal neutron decay time to provide ratio logs having greatly improved accuracy.

Accordingly, it is an object of the present invention to provide novel methods for determining the characteristics of earth formations, particularly the concentration of an element having a high neutron capture cross-section, specifically chlorine.

Another object of the present invention is to provide for improved methods for distinguishing oil-bearing formations from salt water bearing formations which are traversed by a borehole.

These and other objects and features of the present invention will be apparent from the following detailed description taken with reference to the figures of the accompanying drawings. In the drawings:

FIG. 2 shows a typical scintillation pulse height spectrum for gamma rays emitted as a result of thermal neutron capture by a substance containing a relatively high proportion of chlorine;

FIG. 3 shows a typical scintillation pulse height spectrum for gamma rays emitted as a result of thermal neutron capture by a substance containing a relatively low proportion of chlorine;

FIG. 5 is a graph showing counting rate as a function of time for a typical formation.

Figure 1:
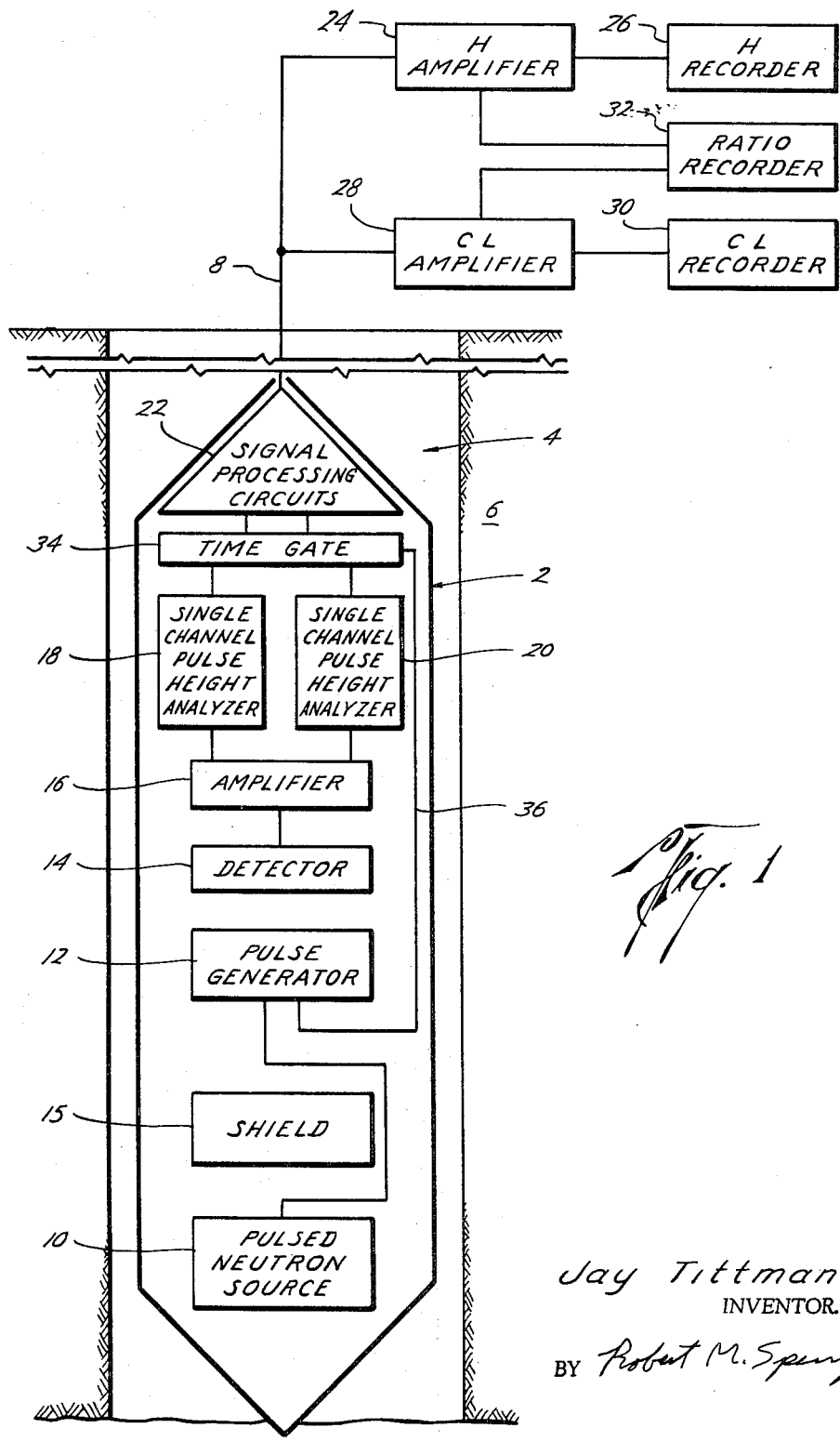
FIG. 1 is a diagrammatic representation of apparatus embodying the present invention for logging a borehole.

In a form of the present invention chosen for purposes of illustration in the drawing, FIG. 1 shows a subsurface instrument 2 suspended in a borehole 4 which penetrates the earth 6. The instrument 2 is supported by a cable 8 which may be wound onto or off a suitable winch, not shown, in a conventional manner to cause the instrument 2 to traverse the borehole 4. The cable 8 also serves to transmit electrical signals between the subsurface instrument 2 and the surface of the earth, as is well-known to those skilled in the art.

Within the subsurface instrument 2 is a source 10 which is capable of emitting high energy neutrons in bursts or pulses of controlled duration. Typical of such sources is that disclosed in the patent of Clark Goodman, Patent No. 2,991,364, issued July 4, 1961. Typically, such source emits neutrons having energies of about 14 mev. However, it should be understood that other pulsed neutron sources could be employed, if desired, to practice the present invention. As shown, the pulsing of source 10 is controlled by a suitable pulse generator 12. Preferably, the source 10, pulse generator 12 and other electronic components of the subsurface instrument are energized by a suitable power source, not shown, at the surface of the earth connected through cable 8. However, the means for accomplishing this are conventional and well known. Hence, for clarity, they have been omitted from the description of the present invention.

Also contained in the subsurface instrument 2 is an energy responsive gamma ray detector 14, such as a scintillation detector, which detects gamma rays incident thereon and emits electrical signals indicative of the number and energies of the incident gamma rays. The detector 14 is protected against direct radiation from source 10 by suitable shielding 15 in a conventional manner. The signal from detector 14 may be amplified, as by amplifier 16, and is then passed to suitable pulse height analyzer circuits 18 and 20.

FIG. 2 shows a typical scintillation pulse height spectrum for gamma rays emitted as a result of thermal neutron capture by a substance containing a relatively high proportion of chlorine. It will be noted that there is a strong peak at about 2.23 mev. and two smaller, yet distinct, peaks at about 5.0 and 5.5 mev. The peak at 2.23 mev. is indicative of thermal neutron capture by hydrogen while the peaks at 5 and 5.5 mev. are indicative of capture by chlorine. FIG. 3 is similar to FIG. 2 but shows a typical spectrum resulting from thermal neutron capture by a substance having a relatively low proportion of chlorine. As would be expected, the chlorine peaks are much more prominent in FIG. 2 than in FIG. 3 since more chlorine is present to contribute gamma rays in this range. At the same time, it should be noted that the hydrogen peak is much stronger in FIG. 3 than in FIG. 2. However, this does not necessarily indicate that there is more hydrogen present in the substance exhibiting the spectrum of FIG. 3.

As indicated above, the source 10 emits periodic bursts of neutrons. Preferably, these bursts are of uniform duration, for example, 25 microsecond bursts at intervals of 1000 microseconds. The neutrons then are scattered through the formations and gradually lose energy until they reach thermal energies, after which, they are captured by the various elements contained in the formations. Since the thermal neutron capture cross-section for chlorine is about 100 times larger than the cross-sections for other elements normally contained in a formation, the neutrons will be preferentially captured by chlorine and, where the proportion of chlorine is relatively large, the number of neutrons available for capture by the other elements will be greatly reduced. Hence, the portions of the capture gamma ray spectrum indicative of such other elements will be depressed even though appreciable quantities of these elements may be present. This is illustrated by the reduction of the hydrogen peak in FIG. 2 as compared with that of FIG. 3.

To detect this effect with the apparatus of FIG. 1, pulse height analyzer 18 may be set to pass only those signals from detector 14 which are indicative of gamma rays having energies of about 2.23 mev. and, hence, represent captures of thermal neutrons by hydrogen. Similarly, pulse height analyzer 20 may be set to pass only those signals which are indicative of gamma rays having energies of about 4.75 to 6.0 mev. and, hence, represent neutron captures by chlorine. The range of pulse amplitudes passed by pulse height analyzer 18 may be referred to as the "hydrogen window" and has been represented in FIGS. 2 and 3 by the dotted lines identified as "H window." Similarly, the pulse amplitude range passed by pulse height analyzer 20 may be referred to as the "chlorine window" and has been represented in FIGS. 2 and 3 by the dotted lines identified as "Cl window." The signals from pulse height analyzer circuits 18 and 20 are passed then through suitable signal processing circuits 22 and are transmitted by means of the cable 8 to the surface of the earth. The signal processing circuits 22 may include such conventional means as amplifiers, pulse shaping circuits, blocking oscillators and the like, which serve to prepare the signals in a desired manner and to impress them on the cable 8 for transmission to the surface of the earth. The specific means employed and the circuitry thereof will depend upon numerous considerations. However, all of these are conventional and well-known and, hence, their specific form does not characterize the present invention. At the surface, the signals from pulse height analyzer circuit 18 are passed to a suitable amplifier 24 and are recorded, as a function of depth, by a suitable recorder 26. Similarly, the signals from pulse height analyzer circuit 20 are passed to a suitable amplifier 28 and are recorded, as a function of depth, by a suitable recorder 30. In addition, the signals from amplifiers 24 and 28 are passed to a ratio recorder 32 which derives the ratio of the signals and records the value if the ratio as a function of depth. It should be understood that recorders 26, 30 and 32 may include appropriate electronic circutry, such as counting rate circuits, integrating or scaling circuits, as is well-known in the art.

As pointed out above, the purpose of the present invention is to distinguish formations containing oil from formations containing salt water. Since the ratio of hydrogen to chlorine will be relatively high in oil bearing formations and relatively low in formations containing salt water, it is this ratio which is of interest. By determining the ratio of the portions of the spectra of FIGS. 2 and 3 contained in the hydrogen and chlorine windows, it will be seen that this information can be obtained without regard to the actual number of counts involved. In fact, because of the much larger capture cross section of chlorine, the value of the ratio will be exaggerated so that the difference between the value of the ratio for an oil bearing formation and the value for a salt water bearing formation will be relatively greater than the difference between the numbers of gamma rays due to chlorine in these formations. Thus, in FIG. 2, the signal appearing in the hydrogen window is approximately twice that appearing in the chlorine window. In contrast, in FIG. 3, the signal appearing in the hydrogen window is approximately ten times that appearing in the chlorine window. Thus, the ratio varies by 500 percent whereas the difference in chlorine counts alone amounts to perhaps 100 or 200%. Accordingly, the desired information may be obtained by determining the ratio of the signal in the hydrogen window to the signal in the chlorine window and recording the value of the ratio.

It can be shown that, if the formation hydrogen is contained exclusively in the pore fluid, the average number of hydrogen gamma rays produced per second, which may be represented as $C_H$, is, in first approximation $$C_H = \text{constant } f\phi \qquad (1)$$

where $f$ is a suitable space average of the thermal neutron flux and $\phi$ is the formation porosity. Similarly, the average number of chlorine gamma rays produced per second in the energy range of interest may be represented as $C_{Cl}$, is $$C_{Cl} = \text{constant } f\phi s S_w \qquad (2)$$

where $s$ is the salinity of the interstitial water and $S_w$ is the water saturation of the formation. Obviously, the quantity $sS_w$ represents the chlorinity of the formation. Accordingly, taking the ratio of these gamma ray production rates gives $$\frac{C_H}{C_{Cl}} = \frac{\text{constant } f\phi}{\text{constant } f\phi s S_w} = \frac{1}{sS_w} \qquad (3)$$

The technique of the prior art, as here discussed, attempts to measure counting rates in the H and Cl windows in such a manner that they are proportional to the gamma ray production rates $C_H$ and $C_{Cl}$. The achievement of this goal, however, is beset with problems related to the limited resolution of conventional gamma ray spectropscopy detectors. It is apparent that with the technique of the prior art, a 1% change in $sS_w$ will produce, at best, a 1% change in the ratio of the counting rates $C_H/C_{Cl}$. However, it can be seen that, if the sensitivity of $C_{Cl}$ to chlorinity can be enhanced, then this would provide a much larger range of values for the ratio $C_H/C_{Cl}$ and would give indications of changes in the hydrogen-chlorine ratio which are too slight to be shown on logs made with prior art systems. In effect, the intrinsic ability to resolve small differences in hydrogen-chlorine ratio would be improved.

It has been found that the large capture cross section of chlorine affects not only the relative number of neutrons captured by chlorine nuclei, but also the thermal neutron lifetime; i.e., the interval between the time a neutron reaches thermal energy and the time when it is captured. Because the cross section of chlorine is so large, it tends to capture thermal neutrons very rapidly, whereas other elements, having smaller cross sections, tend to capture neutrons more slowly. In view of this, if a burst of neutrons irradiates a formation containing a high proportion of chlorine, the neutrons will all be captured quickly and the resulting gamma ray spectrum will be of relatively short duration. In contrast, if a burst of neutrons irradiates a formation containing a low proportion of chlorine, the neutrons will survive in the formation for a relatively long time and the resulting gamma ray spectrum will last much longer. The length of time that the neutrons survive in the formations is referred to as the "thermal decay time" or "thermal lifetime" of the neutrons. In accordance with the present invention, this fact is used to eliminate the effects of extraneous elements from the hydrogen-chlorine ratio log described above and to make the log response more sensitive to the chlorine content of the formation.

Various elements, such as calcium and iron, emit neutron capture gamma rays having energies close to those emitted by chlorine. Consequently, it is extremely difficult to distinguish the chlorine gamma rays from those of the extraneous elements. As noted above, this has been a major problem with most of the prior art logging systems. However, the cross sections of these extraneous elements are much smaller than the cross section of chlorine. Therefore, the accuracy with which the portion of the spectrum apeparing in the chlorine window represents the quantity of chlorine present in the formation is a function of the proportion of chlorine to such extraneous elements. Thus, in a formation containing a large proportion of chlorine, most of the neutrons will be captured quickly by the chlorine and the number of neutrons available for capture by the extraneous elements will be reduced. Consequently, the spectrum of the extraneous elements will be depressed, in the manner described above for the hydrogen spectrum. The portion of the spectrum appearing in the chlorine window will, thus, more accurately reflect the quantity of chlorine present in the formation, but will be of short duration. In contrast, in a formation containing a small proportion of chlorine, many more neutrons will be available for capture by the extraneous elements and will result in gamma rays which may appear in the chlorine window. Therefore, the portion of the spectrum appearing in the chlorine window will less accurately represent the quantity of chlorine present in the formation and will be of longer duration.

As discussed above, a log of the ratio of the signals in the hydrogen and chlorine windows may be employed to distinguish oil bearing formations from salt water bearing formations. Moreover, such a ratio log will show greater differences between these types of formations than a log of the quantity of chlorine alone. This is true because, due to the depression of the hydrogen spectrum resulting from the large capture cross section of chlorine, any given change in the amount of chlorine contained in the formation will have an amplified effect upon the ratio log. Further, detection of the ratio $C_H/C_{Cl}$ automatically normalizes out variations in $f\phi$ as shown in Equation 3, and permits determination of salinity without requiring a separate measurement of porosity or thermal neutron flux.

It has also been pointed out that the portion of the capture gamma ray spectrum appearing in the chlorine window is affected by the large cross section of chlorine so that, where chlorine is abundant, the spectrum accurately reflects the amount of chlorine, but is of short duration, whereas, when chlorine is scarce, the spectrum is less accurately indicative of chlorine, but is of longer duration. This fact may be used to further amplify the effect on the ratio log caused by changes in the amount of chlorine contained in the formation.

It should be noted that, for any given formation, the shape and duration of the capture gamma ray spectrum are constant, although they differ for different formations. Thus, by determining the duration of the capture gamma ray spectrum for a formation containing a large proportion of chlorine and by gating the pulse height analyzer 20 which sends signals to the chlorine channel amplifier 28 of FIG. 1, to pass signals only for a time interval corresponding to that duration, the desired result can be obtained. By gating the chlorine window in this manner, it will be seen that, for formations of high chlorinity and, hence, having accurate spectra, the duration of the spectra will approximate the gating period. Consequently, substantially all of the pulses falling in the chlorine window of single channel pulse height analyzer 20 will be passed. In contrast, for formations of low chlorinity which produce pulses in the chlorine window from extraneous elements, the duration of the period in which pulses are fed to the analyzer 20 will be much longer than the gating period. Consequently, many or most of these pulses will be blocked at the output of pulse height analyzer 20. As a result, the effects of extraneous elements on the counting rate reaching amplifier 28 will be materially reduced. This will serve to depress the chlorine signal for formations of low chlorinity since spurious pulses have been eliminated, and will, thereby, increase the sensitivity of the ratio log to changes in the chlorine content of the formations. In contrast, pulse height analyzer 18, which sends signals to the hydrogen channel amplifier 24, is left open for a longer time interval corresponding to the duration of the capture gamma ray spectrum for a formation containing virtually no chlorine or, preferably until the start of the next neutron burst from source 10. In this way, substantially all of the gamma rays resulting from neutron capture by hydrogen will be recorded. Consequently, Equation 3 is changed to $$\frac{C_H}{C_{Cl}} = \frac{1}{ksS_W} \quad (4)$$

where $k$ is a function of the thermal decay time of the neutrons. Since the spurious counts in the chlorine channel are depressed, by the time gating of pulse height analyzer 20, for formations of low chlorinity, whereas the hydrogen signal is depressed, due to the large capture cross section of chlorine, for formations of high chlorinity, it will be seen that the range of such a log of the ratio of the hydrogen signal to the chlorine signal as defined by Equation 3, will be greatly expanded. Consequently, this time-weighted ratio log will provide a highly sensitive indication of the chlorinity of the formations and will accurately and reliably distinguish oil bearing formations from salt water bearing formations.

To accomplish the gating of pulse height analyzer 20 in the apparatus of FIG. 1, a suitable time gate circuit 34 is connected between pulse height analyzers 18 and 20 and the signal processing circuits 22. The time gate circuit 34 is preferably connected, as by conductor 36, for operation by pulse generator 12. Time gate circuit 34 holds pulse height analyzers 18 and 20 gated "off," so that no signals are passed, while the source 10 is emitting neutrons and continues to hold them in this condition for a time after source 10 has been turned off in order to allow the neutrons to reach thermal energy. On a signal from pulse generator 12, time gate circuit 34 gates pulse height analyzers 18 and 20 "on" and allows them to pass signals to the surface of the earth. After a predetermined interval of about 200 microseconds, time gate circuit 34 gates pulse height analyzer 20 "off" to close the chlorine window as discussed above. Pulse height analyzer 18 is held "on" for a longer time, possibly until the start of the next neutron burst. Thus, for example, pulse generator 12 can turn neutron source 10 "on" for about 50 microseconds and then "off" for about 950 microseconds. After source 10 has been turned "off" for about 50 microseconds, pulse generator 12 can trigger time gate 34 to gate pulse height analyzers 18 and 20 "on." Two hundred microseconds later, time gate circuit 34 gates pulse height analyzer 20 "off" while pulse height analyzer 18 is kept "on" until the start of the subsequent neutron brust.

Obviously, if desired, time gate circuit 34 could be connected between amplifier 16 and the pulse height analyzers 18 and 20. Moreover, as shown in FIG. 1, pulse height analyzers 18 and 20 and time gate circuit 34 are contained in the subsurface instrument 2. However, it will be apparent that these components could, if desired, be positioned at the surface of the earth.

One disadvantage of the system hereinabove described arises from the fact that substances may sometimes be present in the formations or in the borehole which will absorb neutrons without emitting gamma rays. Boron is an example of such substances and is sometimes found in drilling mud. When such neutron absorbers are present, they decrease the thermal neutron lifetime and, thereby, depress the entire gamma ray spectrum. With the system described above, the presence of such absorbers would affect the chlorine signal channel more strongly than the hydrogen signal channel; consequently, the time-weighted ratio log, described above, may be affected. Where this condition is known to exist, various steps may be taken to correct or compensate for this effect. However, frequently the condition exists without the knowledge of the operator with the result that the time-weighted ratio log might be subject to misinterpretation. To overcome this situation and provide an indication whenever such absorbers are present, the apparatus of FIG. 4 may be employed.

Figure 4:
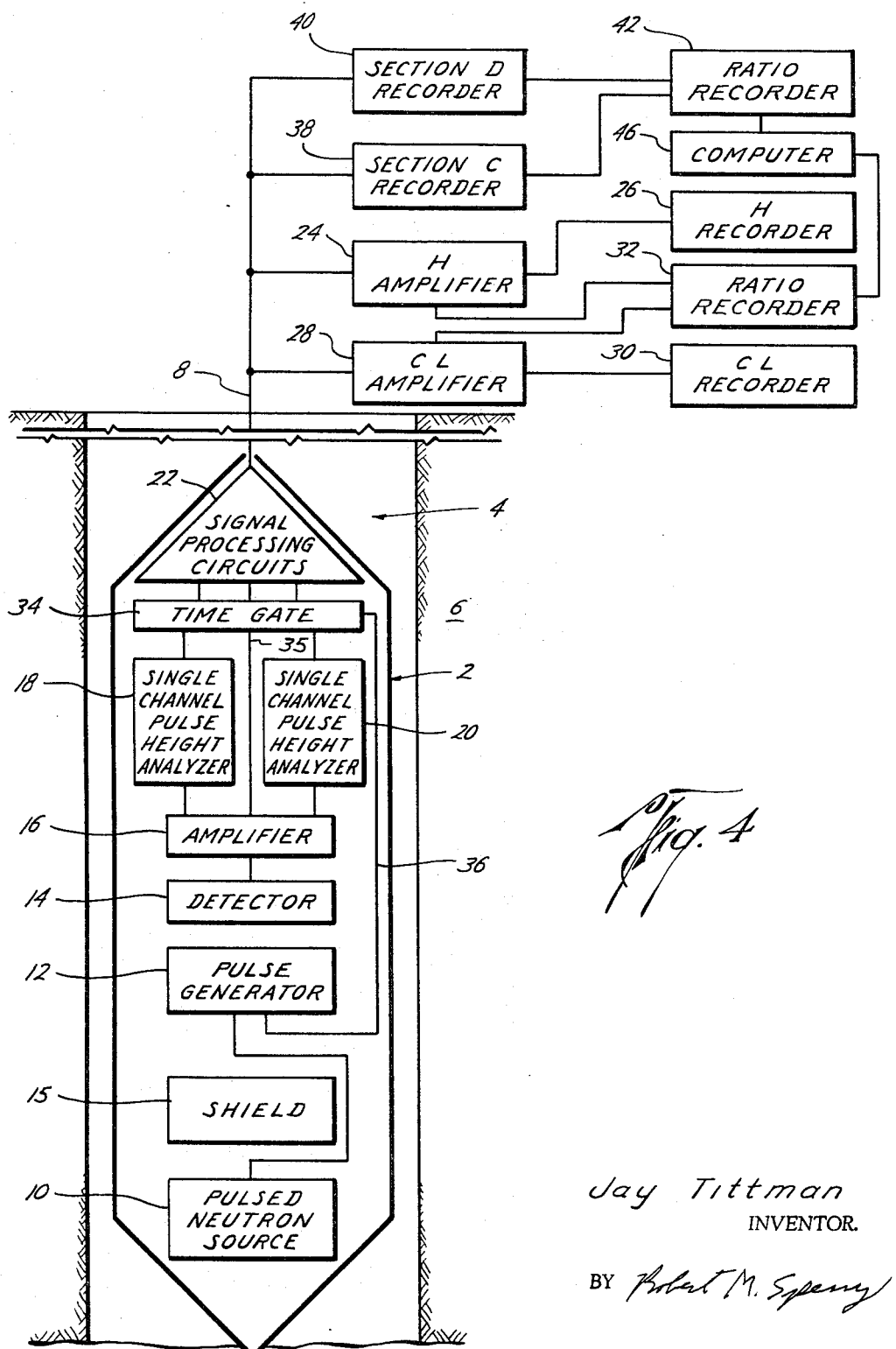
FIG. 4 is a diagrammatic representation of a modified form of the apparatus of FIG. 1.

As seen in FIG. 4, the subsurface instrument 2 is similar to that of FIG. 1. However, the time gate circuit 34 is also connected, by conductor 35, to receive a signal from amplifier 16 representing the total counting rate of detector 14. Moreover, at the surface, two addition recorders 38 and 40 are provided together with an additional ratio recorder 42 which is connected to receive signals from recorders 38 and 40. As indicated above with respect to FIG. 1, recorders 38, 40, and 42 may include appropriate electronic circuits, such as counting rate circuits, integrating or scaling circuits.

Referring to FIG. 5, a curve 44 is shown representing the counting rate of detector 14 as a function of time. This curve is repeated for each burst of neutrons from the source 10. It will be seen that the curve 44 has been divided into four sections, designated *a*, *b*, *c*, and *d*. When the source 10 is turned on, the counting rate rises rapidly, due to gamma rays resulting bombardment of the formations by neutrons from the source 10 and due to fast neutrons, to which the detector may be responsive, being scattered into the detector. After leaving the source 10, the neutrons will lose energy by scattering until they reach thermal energy. However, after source 10 has been turned off, no additional neutrons will be emitted. After they have reached thermal energy the neutrons both diffuse away from the positions at which they became thermal and also proceed to get absorbed by elements in the formation. Thus, when the rate of removal equals the rate at which they are arriving at thermal energy, a maximum appears as shown at 43 in FIG. 5. This is followed by a fall-off of the counting rate since the neutrons are being removed more rapidly than they are arriving at thermal energy. This is represented by section *b* of curve 44. Subsequently, the neutrons diffuse through the formation until they are captured. This is represented by sections *c* and *d* of curve 44. The capture process has been discussed at length above. However, it may be pointed out here that the slope of curve 44 in sections *c* and *d*, that is, the duration of the capture gamma ray spectrum, will be a function of the thermal neutron capture cross section of the elements of the formation.

In the hydrogen-chlorine ratio logging apparatus disclosed above, the pulse height analyzers 18 and 20 are gated "off" by time gate circuit 34 during the periods represented in FIG. 5 by sections *a* and *b*. Both pulse height analyzers 18 and 20 are then gated "on" and pass signals during the period represented by section *c* of FIG. 5. Thereafter, pulse height analyzer 20 is gated "off," closing the chlorine window, while pulse height analyzer 18, the hydrogen window, remains "on" until perhaps the start of the subsequent neutron brust from source 10. With the modified apparatus of FIG. 4, time gate circuit 34 also serves to pass signals from amplifier 16 to recorder 38 during the period represented by section *c* of FIG. 5, but blocks signals from recorder 40 during that period. During period *d* of FIG. 5, time gate circuit 34 reverses this procedure and blocks signals from recorder 38, but passes signals to recorder 40. Recorders 38 and 40 each record the signals received as functions of time. Thus, recorder 38 indicates the average counting rate of detector 14 during period *c* of curve 44 of FIG. 5, while recorder 40 indicates the average counting rate of detector 14 during period *d*. Ratio recorder 42 determines the ratio of the signal recorded by recorder 38 to that of recorder 40 and records the value of this ratio or its reciprocal as a function of depth. The log provided by ratio circuit 42 represents the average lifetime for thermal neutrons in the formation, or, as it is also called, the thermal neutron decay time.

As discussed above, the thermal neutron lifetime will be a function of the thermal neutron cross sections of the elements contained in the formation. In the absence of adverse absorbers, such as boron, the log made by ratio recorder 42 will indicate the chlorinity of the formations in much the same manner as the log made by ratio recorder 32. However, when boron or other adverse absorbers are present, the log made by ratio recorder 42 will show a different value of apparent chlorinity than that shown by ratio recorder 32. Where such a difference is noted, the operator will be aware that he must correct for the effects of such absorbers and the amount of the difference will indicate the amount of correction required. If desired, the signals from ratio recorders 32 and 42 may be supplied to a suitable computer 46 which will compare the two signals by solving two simultaneous equations based on the respective signals and will provide a corrected log which accurately indicates the hydrogen-chlorine ratio together with a log showing the amount of the harmful absorbers present in the formation.

The apparatus of FIG. 4 may be employed in an alternative method, if desired, with additional advantages. In accordance with this alternative method, the hydrogen and chlorine signal channels are both kept "open" for the full measuring cycle to provide a conventional hydrogen-chlorine ratio log while a thermal decay time log is made simultaneously, as an independent measurement of the chlorinity of the formations. By leaving both the hydrogen and chlorine signal channels open for the full measuring cycle, non-gamma ray emitting neutrons absorbing materials, such as boron, will equally affect both channels. Consequently, their effect will be cancelled out in the ratio recorder 32. Computer 42 will then combine the thermal decay time signal with the conventional hydrogen-chlorine ratio signal to increase the chlorine sensitivity of the system in a manner similar to that of the time gated hydrogen-chlorine ratio log described above with respect to the apparatus of FIG. 1.

To accomplish this method with the apparatus of FIG. 4, time gate circuit 34 is driven by pulse generator 12 to turn neutron source 10 on and off to emit periodic bursts of high energy neutrons, in the same manner as hereinabove described. After the source 10 has been turned off, time gate circuit 34 opens the hydrogen signal channel from pulse height analyzer 18 to hydrogen amplifier 24; the chlorine signal channel from pulse height analyzer 20 to chlorine amplifier 28; and passes pulses directly from amplifier 16 to section *c* recorder 38, while blocking signals from section *d* recorder 40. At a given signal from pulse generator 12, time gate circuit 34 blocks the passage of signals to section *c* recorder 38 and passes pulses to section *d* recorder 40, while keeping both the hydrogen and chlorine signal channels open. On a subsequent signal from pulse generator 12, time gate circuit 34 closes all of the signal channels. With this arrangement, hydrogen recorder 26 and chlorine recorder 30 will record all of the signals passed by their respective signal channels during the entire measuring cycle and ratio recorder 32 will derive the ratio of the signals from hydrogen recorder 26 to those of chlorine recorder 30 and will record a conventional hydrogen-chlorine ratio log. At the same time, ratio recorder 42 derives the ratio of the signals from section $d$ recorder 40 to those from section $c$ recorder 38 and records the value of this ratio as an indication of the thermal decay time of the formations. As noted above, the thermal decay time log is primarily a measure of the chlorine content of the formations, in the absence of other significant absorbers, such as boron. Thus, computer 46 can receive signals from ratio recorders 32 and 42 and can combine them to provide a chlorine-weighted hydrogen-chlorine ratio log similar to that of the time-weighted ratio log described above with respect to the apparatus o FIG. 1.

The effects of absorbers, such as boron, are cancelled out of the ratio log in this manner, since the entire capture gamma ray spectrum is reduced by such absorbers and both signal channels are affected by the absorbers during the entire measuring cycle. As described with respect to FIG. 1, the chlorine signal channel will be affected by gamma rays from extraneous elements, such as calcium and iron, particularly in formations of low chlorinity. At the same time, the chlorinity signal derived by ratio recorder 42 from the thermal decay times is affected by both non-gamma ray emitting absorbers, such as boron, and by the extraneous elements. However, these separate measurements of chlorinity can be employed by the computer 46 to provide a chlorine-weighted hydrogen-chlorine ratio log by multiplying the signals from ratio recorder 32 by the signals from ratio circuit 42 in accordance with the equation $$R_{H/Cl} \times R_T = \frac{e^{\frac{-sS_W}{k_1}}}{k_2 s S_W} \tag{5}$$

where $R_{H/Cl}$ is the conventional ratio log, $R_T$ is the output signal of the thermal decay time log; $k_1$ and $k_2$ are different functions of porosity and sonde design constants; and $e$ is the base of the natural logarithmic system. It will be apparent that a log based upon Equation 5 will be strongly affected by chlorine and, hence, will provide a chlorine-weighted ratio log similar to the time-weighted ratio log described above for the apparatus of FIG. 1.

While the invention has been described hereinabove in connection with hydrogen-chlorine well logging, it will be understood that the method of the present invention may be employed in any capture gamma ray spectral analysis operation where it is desired to distinguish the effects of elements having high thermal neutron absorption cross sections, whether or not they emit thermal capture gamma rays, from the effects of elements having low thermal neutron absorption cross sections. In addition, numerous other variations and modifications may obviously be made without departing from the present invention. Accordingly, it should be clearly understood that the form of the invention described above and shown in the accompanying drawings is illustrative only and is not intended to limit the scope of the invention.

What is claimed is:

1. A method of determining the characteristics of earth formations traversed by a well comprising the steps of irradiating said formations with bursts of fast neutrons, selectively detecting prompt gamma rays resulting from thermal neutron capture interactions with chlorine nuclei in said formations only during first relatively short time intervals following the slowing down of said neutrons to thermal energy after respective bursts, selectively detecting prompt gamma rays resulting from thermal neutron capture interactions with hydrogen nuclei in said formations only during second relatively long time intervals extending beyond the respective first time intervals and intermediate successive neutron bursts, and recording indications which vary as a function of the capture gamma rays from chlorine and from hydrogen detected in the respective time intervals.

2. A method of determining the characteristics of earth formations traversed by a well comprising the steps of irradiating said formations with bursts of fast neutrons, selectively detecting prompt gamma rays in a restricted energy range characteristic of thermal neutron capture interactions with chlorine nuclei in said formations only during first time intervals following the slowing down of said neutrons to thermal energy after respective bursts, said first intervals having a duration substantially equal to the thermal neutron decay time in formations of high salinity, selectively detecting prompt gamma rays in the restricted energy range characteristic of thermal neutron capture interactions with hydrogen nuclei in said formations only during second relatively long time intervals overlapping and extending beyond the respective first time intervals and intermediate successive neutron bursts, and recording indications which vary as a function of the capture gamma rays from chlorine and from hydrogen detected in the respective time intervals.

3. A method of determining the characteristics of earth formations traversed by a well and containing first and second elements, the first element having a thermal neutron capture cross-section at least an order of magnitude greater than the second, comprising the steps of irradiating said formations with bursts of fast neutrons, selectively detecting prompt gamma rays resulting from thermal neutron capture interactions with nuclei of said first element in said formations only during first relatively short time intervals following the slowing down of said neutrons to thermal energy after respective bursts, selectively detecting prompt gamma rays resulting from thermal neutron capture interactions with nuclei of said second element in said formations only during second relatively long time intervals extending beyond the respective first time intervals and intermediate successive neutron bursts, and recording indications which vary as a function of the capture gamma rays from said first and from said second element detected in the respective time intervals.

4. A method of determining the characteristics of earth formations traversed by a well comprising and steps of irradiating said formations with bursts of fast neutrons, selectively detecting prompt gamma rays resulting from thermal neutron capture interactions with chlorine nuclei in said formations only during first time intervals following the slowing of said neutrons to thermal energy after respective bursts, said first intervals being substantially coterminous with the emission of prompt capture gamma rays by chlorine in a formation of high salinity, selectively detecting prompt gamma rays resulting from thermal neutron capture interactions with hydrogen nuclei in said formations only during second time intervals inclusive of and extending beyond the respective first time intervals almost to the next succeeding neutron burst, and recording indications which vary as a function of the capture gamma rays from chlorine and from hydrogen detected in the respective time intervals.

5. A method as defined in claim 1 wherein said first time intervals are of about 200 microseconds duration and start about 50 microseconds after the respective neutron burst.

6. A method of determining the characteristics of earth formations traversed by a well and containing first and second elements, comprising the steps of irradiating said formations with bursts of fast neutrons, selectively detecting prompt gamma rays resulting from thermal neutron capture interactions with nuclei of said first element in said formations only during first time intervals following the slowing down of said neutrons to thermal energy after respective bursts, selectively detecting prompt gamma rays resulting from thermal neutron capture interactions with nuclei of said second element in said formations only during second time intervals intermediate successive neutron bursts, further detecting the thermal neutron decay time characterizing said formations, and recording as a function of depth in the well indications which vary as a function of the capture gamma rays from said first element and from said second element detected in the respective time intervals and which vary as a function of said thermal neutron decay time.

7. A method of determining the characteristics of earth formations traversed by a well comprising the steps of irradiating said formations with bursts of fast neutrons, selectively detecting prompt gamma rays resulting from thermal neutron capture interactions with chlorine nuclei in said formations only during first relatively short time intervals following the slowing down of said neutrons to thermal energy after respective bursts, selectively detecting prompt gamma rays resulting from thermal neutron capture interactions with hydrogen nuclei in said formations only during second relatively long time intervals overlapping and extending beyond the respective first time intervals and intermediate successive neutron bursts, further detecting the thermal neutron decay time characterizing said formations, and recording as a function of depth in the well indications which vary as a function of the capture gamma rays from chlorine and from hydrogen detected in the respective time intervals and which vary as a function of said thermal neutron decay time.

8. A method of determining the characteristics of earth formations traversed by a well comprising the steps of irradiating said formations with bursts of fast neutrons, selectively detecting prompt gamma rays resulting from thermal neutron capture interactions with chlorine nuclei in said formations only during first relatively short time intervals following the slowing down of said neutrons to thermal energy after respective bursts, selectively detecting prompt gamma rays resulting from thermal neutron capture interactions with hydrogen nuclei in said formations only during second relatively long time intervals inclusive of and extending beyond the respective first time intervals and intermediate successive neutron bursts, detecting prompt gamma rays resulting from thermal neutron capture interactions with both chlorine and hydrogen nuclei in said formations only during respective third and fourth intervals occurring within said second intervals, and recording indications which vary as a function of the capture gamma rays from chlorine and from hydrogen selectively detected in the respective first and second time intervals and which vary as a function of the ratio of all capture gamma rays detected in said third and fourth intervals.

9. A method of determining the characteristics of earth formations traversed by a well comprising the steps of irradiating said formations with bursts of fast neutrons, selectively detecting prompt gamma rays resulting from thermal neutron capture interactions with chlorine nuclei in said formations only during first time intervals following the slowing down of said neutrons to thermal energy after respective bursts, said first time intervals having a duration substantially equal to the thermal neutron decay time in formations of high salinity, selectively detecting prompt gamma rays resulting from thermal neutron capture interactions with hydrogen nuclei in said formations only during second time intervals intermediate successive neutron bursts, further detecting the thermal neutron decay time characterizing said formations, and recording as a function of depth in the well indications which vary as a function of the capture gamma rays from chlorine and from hydrogen detected in the respective time intervals and which vary as a function of said thermal neutron decay time.

10. A method of determining a characteristic of earth formations traversed by a well and containing first and second elements, the first element having a thermal neutron capture cross section at least an order of magnitude greater than the second, comprising the steps of irradiating said formations with bursts of fast neutrons, selectively detecting prompt gamma rays resulting from thermal neutron capture interactions with nuclei of said first element in said formations only during first relatively short time intervals following the slowing down of said neutrons to thermal energy after respective bursts, selectively detecting prompt gamma rays resulting from thermal neutron capture interactions with nuclei of said second element in said formations only during second time intervals intermediate successive neutron bursts, detecting prompt gamma rays resulting from thermal neutron capture interactions with nuclei in said formations selectively during respective third and fourth time intervals following the slowing down of said neutrons to thermal energy after respective bursts, and recording indications as a function of depth which vary as the ratio of the capture gamma rays from nuclei of said first and second elements selectively detected in the respective first and second time intervals and which vary as a function of the ratio of all capture gamma rays detected in said third and fourth time intervals.

References Cited

UNITED STATES PATENTS

| | | | |
|---|---|---|---|
| 2,725,485 | 11/1955 | Scherbatskoy | 250—83.6 X |
| 2,752,504 | 6/1956 | McKay | 250—71.5 |
| 2,776,378 | 1/1957 | Youmans | 250—83.6 |
| 2,991,364 | 7/1961 | Goodman | 250—83.6 |
| 3,090,867 | 5/1963 | Swanson et al. | 250—71.5 |
| 3,102,956 | 9/1963 | Armistead | 250—83.6 |
| 3,108,188 | 10/1963 | Dewan et al. | 250—71.5 X |
| 3,133,195 | 5/1964 | Jones et al. | 250—71.5 X |

ARCHIE R. BORCHELT, *Primary Examiner.*